United States Patent
Giamati

(10) Patent No.: US 10,703,492 B2
(45) Date of Patent: Jul. 7, 2020

(54) ADHESIVE LAY-UP AND METHOD FOR ATTACHING PNEUMATIC DE-ICERS

(71) Applicant: Goodrich Corporation, Charlotte, MN (US)

(72) Inventor: Michael John Giamati, Akron, OH (US)

(73) Assignee: Goodrich Corporation, Charlotte, NC (US)

( * ) Notice: Subject to any disclaimer, the term of this patent is extended or adjusted under 35 U.S.C. 154(b) by 382 days.

(21) Appl. No.: 15/872,129

(22) Filed: Jan. 16, 2018

(65) Prior Publication Data

US 2019/0217961 A1  Jul. 18, 2019

(51) Int. Cl.
| | | |
|---|---|---|
| *B64D 15/16* | (2006.01) | |
| *C09J 5/02* | (2006.01) | |
| *C09J 7/38* | (2018.01) | |
| *B32B 7/12* | (2006.01) | |

(52) U.S. Cl.
CPC .............. *B64D 15/166* (2013.01); *C09J 5/02* (2013.01); *C09J 7/38* (2018.01); *B32B 7/12* (2013.01); *C09J 2421/00* (2013.01); *C09J 2433/00* (2013.01)

(58) Field of Classification Search
CPC ... C09J 7/385; C09J 7/383; C09J 7/38; B64D 15/166
See application file for complete search history.

(56) References Cited

U.S. PATENT DOCUMENTS

| | | | |
|---|---|---|---|
| 6,250,587 B1 | 6/2001 | Schramm et al. | |
| 6,352,601 B1 | 3/2002 | Ray | |
| 6,613,831 B1 * | 9/2003 | Bentley | C08L 9/10 524/501 |
| 8,389,596 B2 * | 3/2013 | Boyce | B65D 75/5805 522/184 |
| 8,398,306 B2 * | 3/2013 | Kinigakis | B65D 33/20 383/211 |
| 2003/0122037 A1 * | 7/2003 | Hyde | B64D 15/166 244/134 A |

FOREIGN PATENT DOCUMENTS

| | | |
|---|---|---|
| EP | 0980827 A1 | 2/2000 |
| WO | WO2012080830 A2 | 6/2012 |

OTHER PUBLICATIONS

Extended European Search Report for EP Application No. 19152119.4, dated Jun. 13, 2019, pp. 7.

* cited by examiner

*Primary Examiner* — Brian M O'Hara
(74) *Attorney, Agent, or Firm* — Kinney & Lange, P. A.

(57) ABSTRACT

A method of attaching a pneumatic de-icer to an aircraft wing includes using two pressure sensitive adhesive layers. A first pressure sensitive adhesive layer is attached to a primed aircraft wing, while a second pressure sensitive adhesive layer is attached to the pneumatic de-icer. The two pressure sensitive adhesive layers are attached to each other to create a high energy bond between the pneumatic de-icer and the aircraft wing.

19 Claims, 3 Drawing Sheets

ADHESIVE LAY-UP AND METHOD FOR ATTACHING PNEUMATIC DE-ICERS

BACKGROUND

This application relates generally to ice protection technology, and specifically to pneumatic de-icer assemblies.

Pneumatic de-icers for aircraft are bonded directly to an airframe, usually a wing, with varying types of adhesives. Pressure sensitive adhesives (PSAs) are frequently used, typically with a thickness in the range of about 10 mils. These types of PSAs are laminated to pneumatic de-icers during pneumatic de-icer manufacturing and shipped with release liners to prevent dust and contamination. The release liner on the PSA is removed when the pneumatic de-icer is applied to a wing surface.

When the pneumatic de-icer is applied to the wing surface, a hand roller can be used to "wet out" the PSA adhesive for increased adhesion. However, during this application, it is difficult to develop enough pressure throughout the pneumatic de-icer construction. This is due in part to varying construction throughout the pneumatic de-icer, and due to the thickness of the pneumatic de-icer. Thus, some features of the pneumatic de-icer make it difficult to achieve uniform pressure and obtain a good "wetted out" surface with excellent adhesion. Because of this, some areas tend to lift or peel back from the wing after time passes.

SUMMARY

A method of attaching a pneumatic de-icer to an aircraft wing includes applying a pressure sensitive adhesive primer to a wing surface, attaching a first pressure sensitive adhesive layer to the wing surface through the pressure sensitive adhesive primer, attaching a second pressure sensitive adhesive layer to a pneumatic de-icer, and bonding the second pressure sensitive adhesive layer to the first pressure sensitive adhesive layer so that the pneumatic de-icer is attached to the wing surface by a pressure sensitive adhesive to pressure sensitive adhesive bond.

DETAILED DESCRIPTION

Using two layers of pressure sensitive adhesive (PSA) to attach a pneumatic de-icer (PDI) to an aircraft component allows for the creation of a high energy PSA to PSA bond. The PSA to PSA bond allows for full "wetting out" of the PSA adhesive layers and a strong bond that prevents peeling or lifting of the PDI off the aircraft component.

Figure 1A:
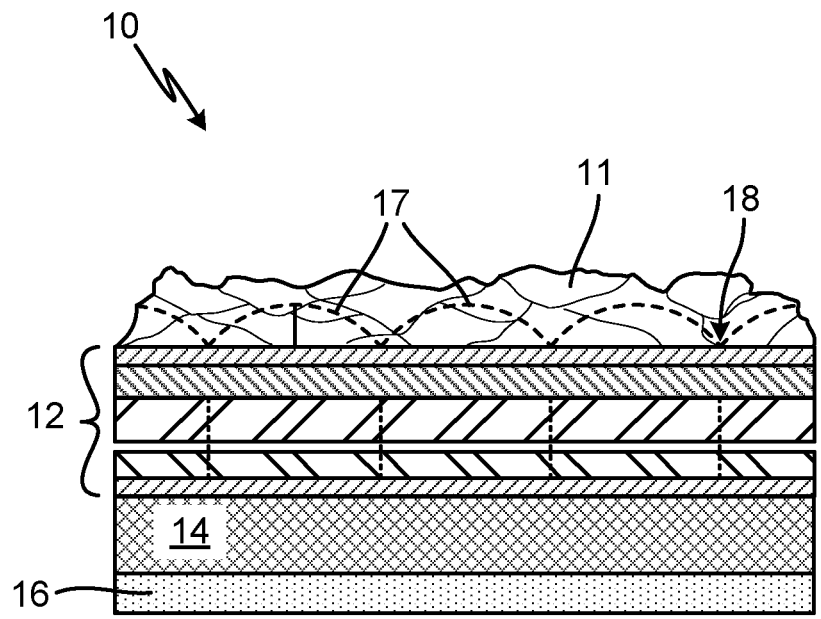
FIGS. 1A-1B are schematic drawings of a pneumatic de-icer with an attached pressure sensitive adhesive layer.
Figure 1B:
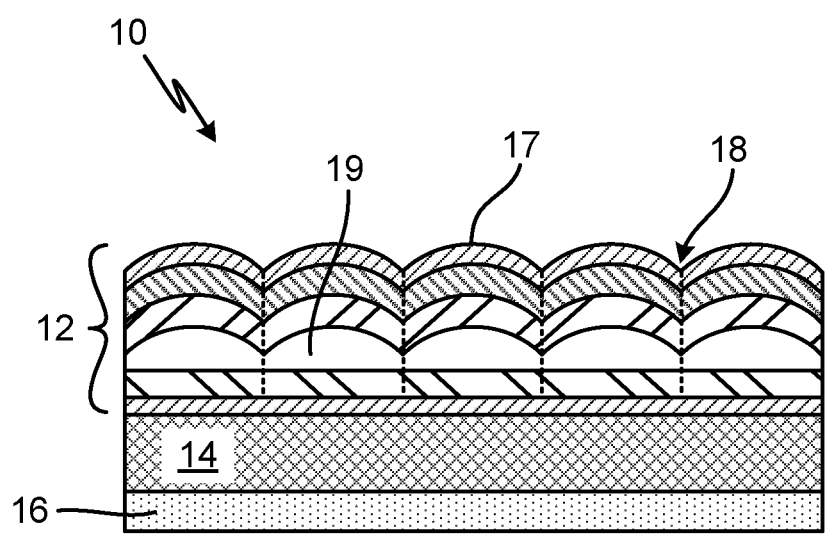

FIGS. 1A-1B are schematic drawings of PDI 12 with attached pressure sensitive adhesive (PSA) layer 14. FIG. 1A shows pneumatic de-icer assembly 10 in a resting configuration, while FIG. 1B shows pneumatic de-icer assembly 10 in an activated configuration. FIGS. 1A-1B will be discussed together. The pneumatic de-icer assembly 10 includes pneumatic de-icer (PDI) 12, PSA layer 14 attached to PDI 12 on the bond side, and release liner 16 covering PSA layer 14.

PDI 12 contains chambers 17, stiches 18, and spaces 19. Chambers 17 in PDI 12 inflates when PDI 12 is activated to mechanically remove ice 11. Stiches 18 define chambers 17 within PDI 12, and hold together all layers that make up PDI 12. Spaces 19 form in chambers 17 when PDI 12 is activated, resulting in mechanical upheaval and dislodging of ice 11 on PDI 12.

PSA layer 14 is attached to PDI 12 opposite chambers 17 so that it is secured to the bond side (not the breeze side) of PDI 12. PSA layer 14 is an adhesive that forms a bond when pressure is applied to marry the adhesive with the surface to which it is being attached. Examples of suitable PSA materials include acrylic PSA or rubber based PSA, for instance, pn VHB 9473 by 3M®. PSA layer 14 is attached to PDI 12 during manufacturing of PDI 12 by wetting out of the PSA layer 14 onto the surface of PDI 12. Release liner 16 cover PSA layer 14 opposite PDI 12. Release line 16 protects PSA layer 14 so that dust or other contaminants do not stick to PSA layer 12 prior to installation of assembly 10A onto an aircraft wing. Assembly 10 (in its non-activated state) is attached to an aircraft component, such as a wing, as shown in FIGS. 2A-2D.

FIGS. 2A-2D are schematic drawings showing a method of attaching a pneumatic de-icer onto an aircraft component in steps 20A-20D. The aircraft component can be, for example, to the leading edge of a wing that will experience ice formation during flight, and will require pneumatic de-icers. The final assembly on wing skin 22 includes PSA primer 24, base PSA layer 26, and pneumatic de-icing assembly 10 as described in reference to FIGS. 1A-1B. Pneumatic de-icing assembly 10 includes both PDI 12 and PSA layer 14.

Figure 2B:
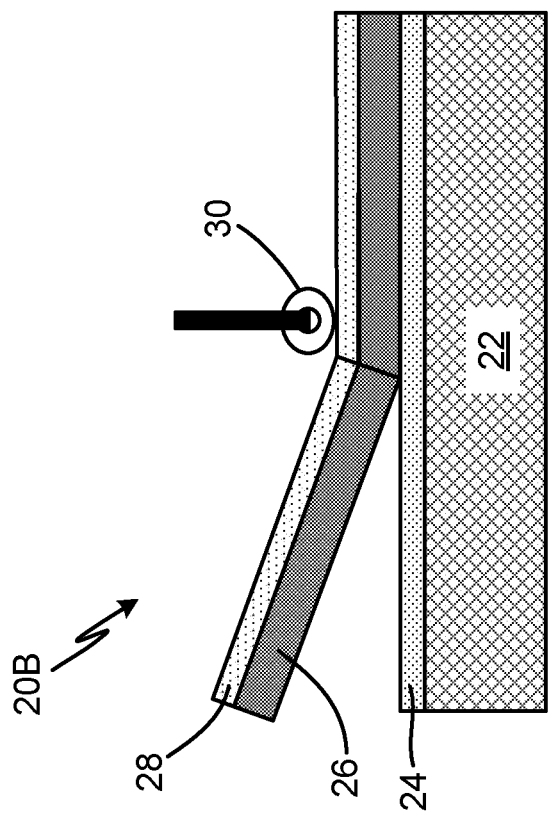
FIGS. 2A-2D are schematic drawings showing a method of attaching a pneumatic de-icer onto an aircraft wing.
Figure 2A:
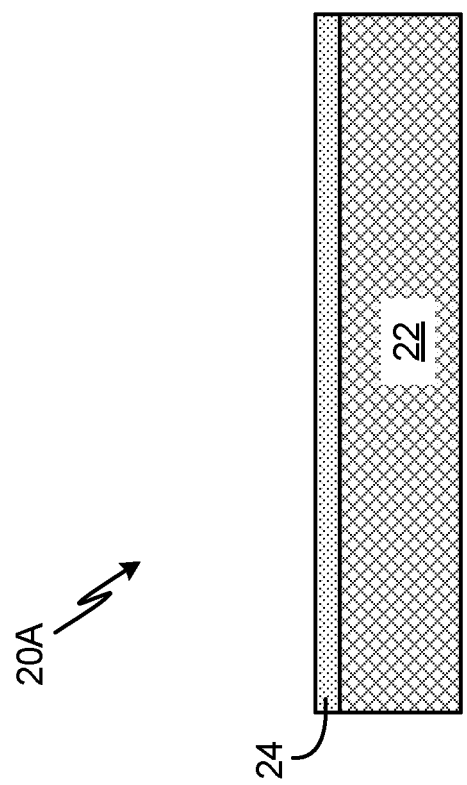

In step 20A shown in FIG. 2A, wing skin 22 is prepared for adhesion of pneumatic de-icer assembly 10 with PSA primer 24. PSA primer 24 promotes adhesion between wing skin 22 and base PSA layer 26. PSA primer 24 can be, for example, pn 94 available from 3M®. PSA primer 24 is applied evenly throughout wing skin 22, and can be applied by spraying, painting, wiping, or other appropriate methods.

Next, in step 20B shown in FIG. 2B, base PSA layer 26 is applied to wing skin 22 on top of primer 24. Like PSA layer 14, base PSA layer 26 is an adhesive that forms a bond when pressure is applied to marry the adhesive with the surface to which it is being attached. Base PSA layer 26 has a thickness of about 5 mils. PSA layer 26 is typically a rolled PSA layer 26 with release liner 28. Base PSA layer 26 is rolled out onto wing skin 22 such that release liner 28 is positioned opposite wing skin 22 as base PSA layer 26 is rolled out onto wing skin 22. Base PSA layer 26 can be, for example, laminated to wing skin 22.

As base PSA layer 26 is rolled onto wing skin 22, Hand roller 30 is used to "wet out" base PSA layer 26 to create a secure bond between wing skin 22 and base PSA layer 26. Applying pressure to PSA layer 26 creates a strong bond between wing skin 22 (including PSA primer 24). Base PSA layer 26 is very thin, and can be efficiently and evenly wetted out with hand roller 30. Optionally, a heat gun can be used to warm base PSA layer 26 and promote wetting out during use of hand roller 30.

Figure 2D:
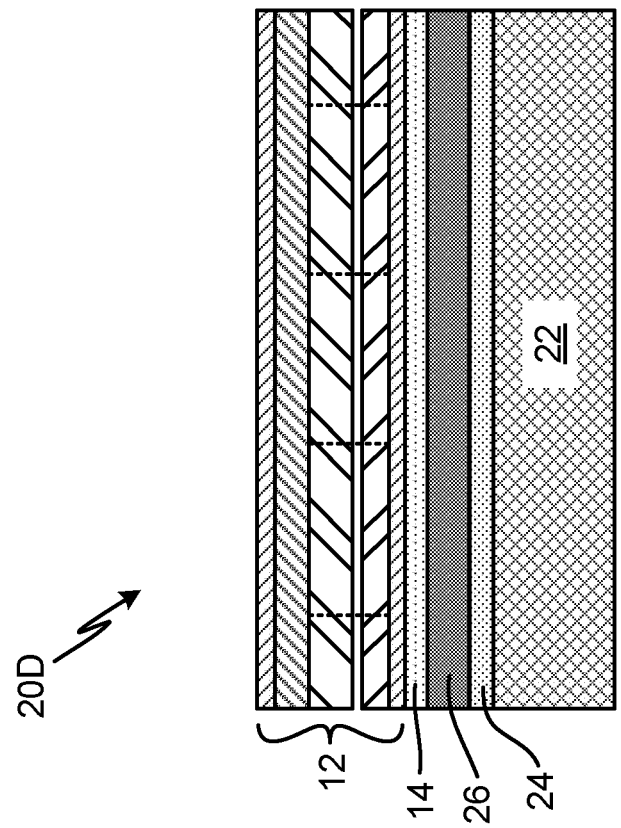
Figure 2C:
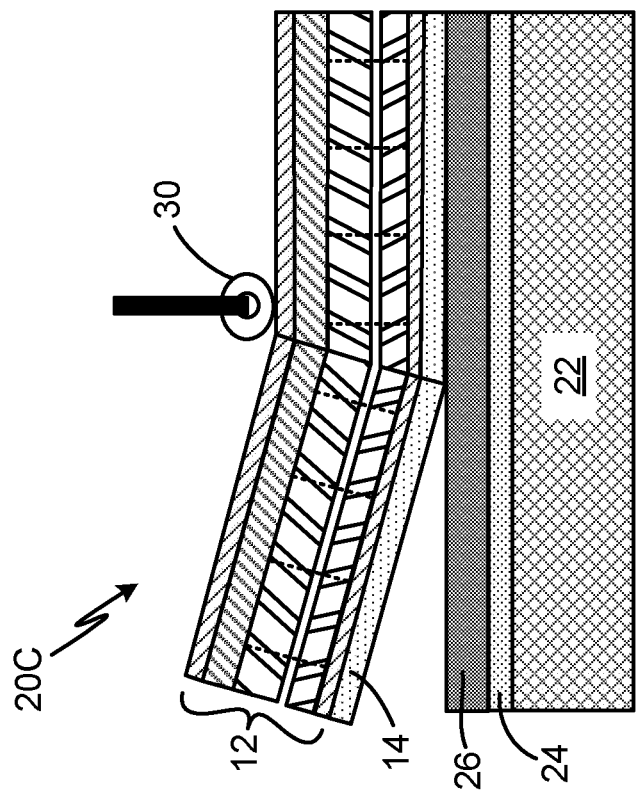

After base PSA layer 26 is applied to wing skin 22, pneumatic de-icer assembly 10 (including PSA layer 14 and PDI 12) is attached to base PSA layer 26 on wing skin 22 as shown by step 20C in FIG. 2C. PDI 12 is a pneumatic de-icing device that mechanically breaks up ice forming on an aircraft wing during flight, typically by inflating sections in PDI 12 as described in reference to FIGS. 1A-1B.

As detailed with reference to FIGS. 1A-1B, when PDI 12 is being manufactured, PSA layer 14 is attached to PDI 12 on the non-activating side of PDI 12. PSA layer 14 can be, for example, laminated or rolled onto PDI 12 to secure PSA layer 14 during manufacturing. PSA layer 14, which has a thickness of about 5 mils, is wetted out to PDI 12 during the manufacturing process. Release liner 16 is secured on PSA layer 14 to prevent dust and contamination prior to application of PDI 12 and PSA layer 14 on wing skin 22. PDI 12 can be shipped with second PSA layer 24 attached.

In FIG. 2C, PDI 12 with attached PSA layer 14 is bonded to base PSA layer 26. The release liner of PSA layer 14 is removed as pneumatic de-icer assembly 10 is attached to base PSA layer 26, and hand roller 30 is used to "wet out" PSA layer 14 as described in reference to FIG. 2B. Rolling first and second PSA layers 16, 22, into each other allows for better wetting out of both layers, and a secure, high energy PSA to PSA bond. This high energy bond prevents peeling or lifting of PDI 12 from wing skin 22.

Finished assembly 20D shown in FIG. 2D includes wing skin 22, PSA primer 24, base PSA liner 26, PSA liner 14, and pneumatic de-icer 12. PSA layers 14, 26, each with a thickness of about 5 mils, replace a traditional single 10 millimeter PSA layer. Alternatively, PSA layers 14, 26, can have differing thicknesses. The resulting PSA to PSA bond achieves maximum adhesion on contact. Both PSA surfaces are very high energy surfaces that bond well to each other. The use of hand roller 30 to wet out both PSA layers helps secure this bond.

Discussion of Possible Embodiments

The following are non-exclusive descriptions of possible embodiments of the present invention.

A method of attaching a pneumatic de-icer to an aircraft wing includes applying a pressure sensitive adhesive primer to a wing surface, attaching a first pressure sensitive adhesive layer to the wing surface through the pressure sensitive adhesive primer, attaching a second pressure sensitive adhesive layer to a pneumatic de-icer, and bonding the second pressure sensitive adhesive layer to the first pressure sensitive adhesive layer so that the pneumatic de-icer is attached to the wing surface by a pressure sensitive adhesive to pressure sensitive adhesive bond.

The method of the preceding paragraph can optionally include, additionally and/or alternatively, any one or more of the following features, configurations and/or additional components:

Applying a pressure sensitive adhesive primer to a wing surface is done by spraying, wiping, or painting.

Attaching a first pressure sensitive adhesive layer to the wing surface is done with a hand roller.

Attaching a first pressure sensitive adhesive layer to the wing surface is done by releasing a liner from the first pressure sensitive adhesive layer.

Attaching a second pressure sensitive adhesive layer to a pneumatic de-icer is performed with a hand roller.

Attaching a second pressure sensitive adhesive layer to a pneumatic de-icer is performed on a bond side of the pneumatic de-icer.

Bonding the second pressure sensitive adhesive layer to the first pressure sensitive adhesive layer is performed with a hand roller.

Bonding the second pressure sensitive adhesive layer to the first pressure sensitive adhesive layer comprises heating the first and second pressure adhesives.

Bonding the second pressure sensitive adhesive layer to the first pressure sensitive adhesive layer is performed by releasing a liner on the second pressure sensitive adhesive layer.

The first pressure sensitive adhesive layer and the second pressure sensitive adhesive layer each have a thickness of 5 mils.

The first pressure sensitive adhesive layer and the second pressure sensitive adhesive layer are selected from the group consisting of acrylic pressure sensitive adhesive and rubber based pressure sensitive adhesive.

The wing skin is a leading edge of an aircraft wing.

The method includes cleaning the wing surface prior to applying the pressure sensitive adhesive primer.

A pneumatic de-icing assembly includes a first pressure sensitive adhesive layer attached to a wing skin, a second pressure sensitive adhesive layer bonded to the first pressure sensitive adhesive layer opposite the wing skin, and a pneumatic de-icer attached to the second pressure sensitive adhesive layer opposite the first pressure sensitive adhesive layer wherein the pneumatic de-icer is s attached to the wing skin by a pressure sensitive adhesive to pressure sensitive adhesive bond.

The assembly of the preceding paragraph can optionally include, additionally and/or alternatively, any one or more of the following features, configurations and/or additional components:

The assembly includes a pressure sensitive adhesive primer between the first pressure sensitive adhesive layer and the wing skin.

The pressure sensitive adhesive to pressure sensitive adhesive bond is a high energy bond.

The first pressure sensitive adhesive layer and the second pressure sensitive adhesive layer each have a thickness of less than 10 mils.

The first pressure sensitive adhesive layer and the second pressure sensitive adhesive layer each have a thickness of 5 mils.

The first pressure sensitive adhesive layer and the second pressure sensitive adhesive layer have the same thickness.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of attaching a pneumatic de-icer to an aircraft wing comprises:
    applying a pressure sensitive adhesive primer to a wing surface;
    attaching a first pressure sensitive adhesive layer to the wing surface through the pressure sensitive adhesive primer;
    attaching a second pressure sensitive adhesive layer to a pneumatic de-icer;
    bonding the second pressure sensitive adhesive layer to the first pressure sensitive adhesive layer so that the pneumatic de-icer is attached to the wing surface by a pressure sensitive adhesive to pressure sensitive adhesive bond.

2. The method of claim 1, wherein applying a pressure sensitive adhesive primer to a wing surface is done by spraying, wiping, or painting.

3. The method of claim 1, wherein attaching a first pressure sensitive adhesive layer to the wing surface is done with a hand roller.

4. The method of claim 1, wherein attaching a first pressure sensitive adhesive layer to the wing surface is done by releasing a liner from the first pressure sensitive adhesive layer.

5. The method of claim 1, wherein attaching a second pressure sensitive adhesive layer to a pneumatic de-icer is performed with a hand roller.

6. The method of claim 1, wherein attaching a second pressure sensitive adhesive layer to a pneumatic de-icer is performed on a bond side of the pneumatic de-icer.

7. The method of claim 1, wherein bonding the second pressure sensitive adhesive layer to the first pressure sensitive adhesive layer is performed with a hand roller.

8. The method of claim 1, wherein bonding the second pressure sensitive adhesive layer to the first pressure sensitive adhesive layer comprises heating the first and second pressure adhesives.

9. The method of claim 1, wherein bonding the second pressure sensitive adhesive layer to the first pressure sensitive adhesive layer is performed by releasing a liner on the second pressure sensitive adhesive layer.

10. The method of claim 1, wherein the first pressure sensitive adhesive layer and the second pressure sensitive adhesive layer each have a thickness of 5 mils.

11. The method of claim 1, wherein the first pressure sensitive adhesive layer and the second pressure sensitive adhesive layer are selected from the group consisting of acrylic pressure sensitive adhesive and rubber based pressure sensitive adhesive.

12. The method of claim 1, wherein the wing skin is a leading edge of an aircraft wing.

13. The method of claim 1, further comprising cleaning the wing surface prior to applying the pressure sensitive adhesive primer.

14. A pneumatic de-icing assembly comprising:
 a first pressure sensitive adhesive layer attached to a wing skin;
 a second pressure sensitive adhesive layer bonded to the first pressure sensitive adhesive layer opposite the wing skin; and
 a pneumatic de-icer attached to the second pressure sensitive adhesive layer opposite the first pressure sensitive adhesive layer wherein the pneumatic de-icer is attached to the wing skin by a pressure sensitive adhesive to pressure sensitive adhesive bond.

15. The assembly of claim 14, further comprising a pressure sensitive adhesive primer between the first pressure sensitive adhesive layer and the wing skin.

16. The assembly of claim 14, wherein the pressure sensitive adhesive to pressure sensitive adhesive bond is a high energy bond.

17. The assembly of claim 14, wherein the first pressure sensitive adhesive layer and the second pressure sensitive adhesive layer each have a thickness of less than 10 mils.

18. The assembly of claim 17, wherein the first pressure sensitive adhesive layer and the second pressure sensitive adhesive layer each have a thickness of 5 mils.

19. The assembly of claim 14, wherein the first pressure sensitive adhesive layer and the second pressure sensitive adhesive layer have the same thickness.

* * * * *